(12) United States Patent
Kamath et al.

(10) Patent No.: US 10,120,399 B1
(45) Date of Patent: Nov. 6, 2018

(54) TRIM TECHNIQUES FOR VOLTAGE REFERENCE CIRCUITS

(71) Applicant: Xilinx, Inc., San Jose, CA (US)

(72) Inventors: Umanath R. Kamath, Citywest (IE); Edward Cullen, Naas (IE); John K. Jennings, Glenageary (IE)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/848,357

(22) Filed: Dec. 20, 2017

(51) Int. Cl.
*G05F 1/46* (2006.01)
*G06F 1/20* (2006.01)

(52) U.S. Cl.
CPC ............ *G05F 1/468* (2013.01); *G05F 1/461* (2013.01); *G06F 1/206* (2013.01)

(58) Field of Classification Search
CPC ........... G05F 1/461; G05F 1/468; G06F 1/206
USPC ........ 327/512, 513, 530, 538, 540, 541, 543
See application file for complete search history.

(56) References Cited

U.S. PATENT DOCUMENTS

| | | | |
|---|---|---|---|
| 5,831,845 A | | 11/1998 | Zhou et al. |
| 6,559,715 B1 | | 5/2003 | Frake et al. |
| 6,815,998 B1 | | 11/2004 | Samad |
| 7,225,099 B1 | | 5/2007 | O'Dwyer |
| 7,859,918 B1 | | 12/2010 | Nguyen et al. |
| 8,508,307 B2 * | | 8/2013 | Mitsuda ................. G05F 3/30 327/132 |
| 2005/0068214 A1 * | 3/2005 | Kim ........................ G01K 1/02 341/144 |
| 2007/0252573 A1 * | 11/2007 | Tachibana ................ G05F 3/30 323/313 |
| 2008/0042765 A1 * | 2/2008 | Tarng ...................... H03B 5/04 331/167 |
| 2008/0042766 A1 * | 2/2008 | Tarng ...................... H03B 5/04 331/167 |
| 2008/0061864 A1 * | 3/2008 | Oberhuber ............... G05F 3/30 327/512 |
| 2009/0243713 A1 * | 10/2009 | Marinca .................... G05F 3/30 327/542 |
| 2011/0057718 A1 * | 3/2011 | Snoeij ....................... H03F 1/30 327/512 |
| 2011/0156825 A1 * | 6/2011 | Aruga ..................... H03K 3/354 331/108 A |

(Continued)

*Primary Examiner* — William Hernandez
(74) *Attorney, Agent, or Firm* — Robert M. Brush (57) ABSTRACT

An example method of trimming a voltage reference in an integrated circuit (IC) includes at a first temperature, sequencing through a first plurality of trim codes for a reference circuit of the voltage reference configured to generate a proportional-to-temperature current and a corresponding first control voltage, and a complementary-to-temperature current and a corresponding second control voltage. The method further includes measuring a voltage output of the voltage reference for each of the first plurality of trim codes to obtain first voltage output values. The method further includes at a second temperature, sequencing through a second plurality of trim codes for the reference circuit. The method further includes measuring the voltage output of the voltage reference for each of the second plurality of trim codes to obtain second voltage output values. The method further includes selecting a trim code for the reference circuit based on the first voltage output values and the second voltage output values.

20 Claims, 10 Drawing Sheets

(56) References Cited

U.S. PATENT DOCUMENTS

2013/0015834 A1*  1/2013  Glibbery .................. G05F 3/30
                                                  323/313
2014/0117967 A1*  5/2014  Mitsuishi ................. G05F 3/30
                                                  323/313

* cited by examiner

TRIM TECHNIQUES FOR VOLTAGE REFERENCE CIRCUITS

TECHNICAL FIELD

Examples of the present disclosure generally relate to electronic circuits and, in particular, to trim techniques for voltage reference circuits.

BACKGROUND

Precision voltage references are important blocks in integrated circuits (ICs), such as System-on-Chip (SoC) ICs. Voltage references are required for various purposes, such as for analog-to-digital converters (ADCs), power management, and the like. Generation of a voltage that is dependent on temperature is also useful in some applications, such as to compensate for temperature effects on circuits. Thus, different circuits in an IC require voltage references having different temperature coefficients (e.g., an ADC uses a temperature-independent voltage reference whereas other circuits, such as switches, require a temperature-dependent voltage reference). Further, circuits for generating voltage references typically use bipolar junction transistors (BJTs). BJTs, however, are parasitic devices in the complementary metal oxide semiconductor (CMOS) process used to fabricate ICs. BJT performance degrades as the CMOS technology scales, which is driven by digital logic. Accordingly, it is desirable to provide trim techniques for correcting mismatch and process variation in voltage reference circuits.

SUMMARY

Trim techniques for voltage reference circuits are described. In an example, a method of trimming a voltage reference in an integrated circuit (IC) includes: at a first temperature, sequencing through a first plurality of trim codes for a reference circuit of the voltage reference configured to generate a proportional-to-temperature current and a corresponding first control voltage, and a complementary-to-temperature current and a corresponding second control voltage; measuring a voltage output of the voltage reference for each of the first plurality of trim codes to obtain first voltage output values; at a second temperature, sequencing through a second plurality of trim codes for the reference circuit; measuring the voltage output of the voltage reference for each of the second plurality of trim codes to obtain second voltage output values; and selecting a trim code for the reference circuit based on the first voltage output values and the second voltage output values.

In another example, an apparatus for trimming a voltage reference in an integrated circuit (IC) includes: a memory; and a processor configured to execute code stored in the memory to: at a first temperature, sequence through a first plurality of trim codes for a reference circuit of the voltage reference configured to generate a proportional-to-temperature current and a corresponding first control voltage, and a complementary-to-temperature current and a corresponding second control voltage; measure a voltage output of the voltage reference for each of the first plurality of trim codes to obtain first voltage output values; at a second temperature, sequence through a second plurality of trim codes for the reference circuit; measure the voltage output of the voltage reference for each of the second plurality of trim codes to obtain second voltage output values; and select a trim code for the reference circuit based on the first voltage output values and the second voltage output values.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1:
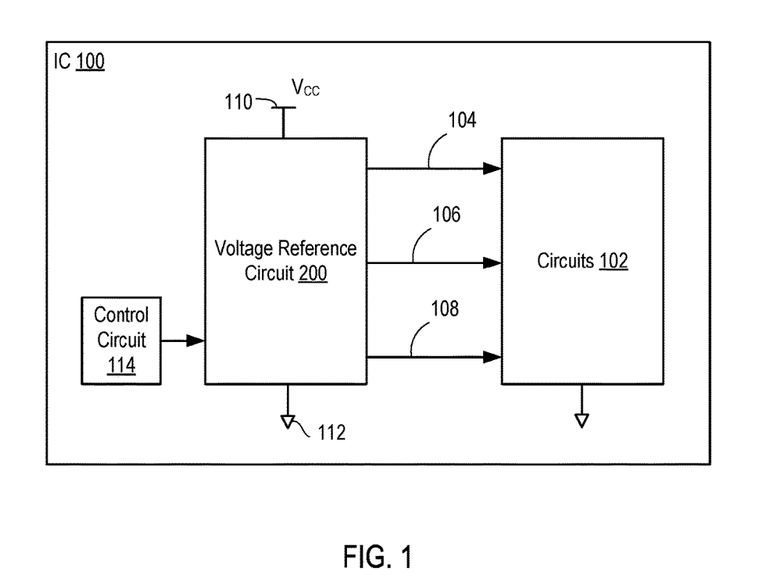
FIG. 1 is a block diagram depicting an integrated circuit (IC) according to an example.

FIG. 1 is a block diagram depicting an integrated circuit (IC) 100 according to an example. The IC 100 includes a voltage reference circuit 200, a control circuit 114, and circuits 102. The voltage reference circuit 200 is coupled between a supply node 110, which supplies a voltage $V_{CC}$, and a ground node 112, which supplies a ground voltage (e.g., 0 volts). The voltage $V_{CC}$ may be provided by a voltage supply (not shown) either within the IC 100 or external to the IC 100. The voltage reference circuit 200 is coupled to one or more of the circuits 102 by one or more nodes 104, each of which supplies a zero temperature coefficient (Tempco) voltage. The voltage reference circuit 200 is coupled to one or more of the circuits 102 by one or more nodes 106, each of which supplies a negative Tempco voltage. The voltage reference circuit 200 is coupled to one or more of the circuits 102 by one or more nodes 108, each of which supplies a positive Tempco voltage. Thus, the voltage reference circuit 200 generates zero Tempco voltage(s), negative Tempco voltage(s), and positive Tempco voltage(s). The control circuit 114 supplies control signals to the voltage reference circuit 200 for trimming voltages and/or currents as described in detail below.

Figure 2:
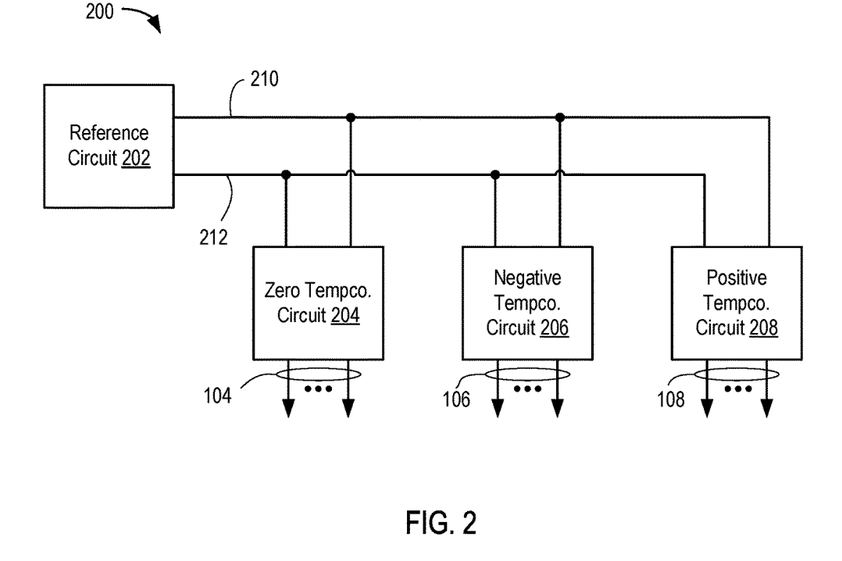
FIG. 2 is a block diagram depicting a voltage reference circuit according to an example.

FIG. 2 is a block diagram depicting the voltage reference circuit 200 according to an example. The voltage reference circuit 200 includes a reference circuit 202, a zero Tempco circuit 204, a negative Tempco circuit 206, and a positive Tempco circuit 208. A node 210 couples one output of the reference circuit 202 to each of the Tempco circuits 204 . . . 208. A node 212 couples another output of the reference circuit 202 to each of the Tempco circuits 204 . . . 208. The nodes 210 and 212 supply control voltages to the Tempco circuits 204 . . . 208. The reference circuit 202 generates a proportional-to-absolute-temperature current (referred to as Iptat) and a complementary-to-absolute-temperature current (referred to as Ictat), as described further below. The control voltages on the nodes 210 and 212 control current sources in the Tempco circuits 204 . . . 208 to mirror the currents Iptat and Ictat, respectively. The zero Tempco circuit 204 converts a zero Tempco current Iztat (Iztat=Iptat+Ictat) into one or more zero Tempco voltages at the nodes 104. The negative Tempco circuit 206 converts the current Iztat into one or more negative Tempco voltages at the nodes 106. The positive Tempco circuit 208 converts the current Iztat into one or more positive Tempco voltages at the nodes 108.

Figure 3:
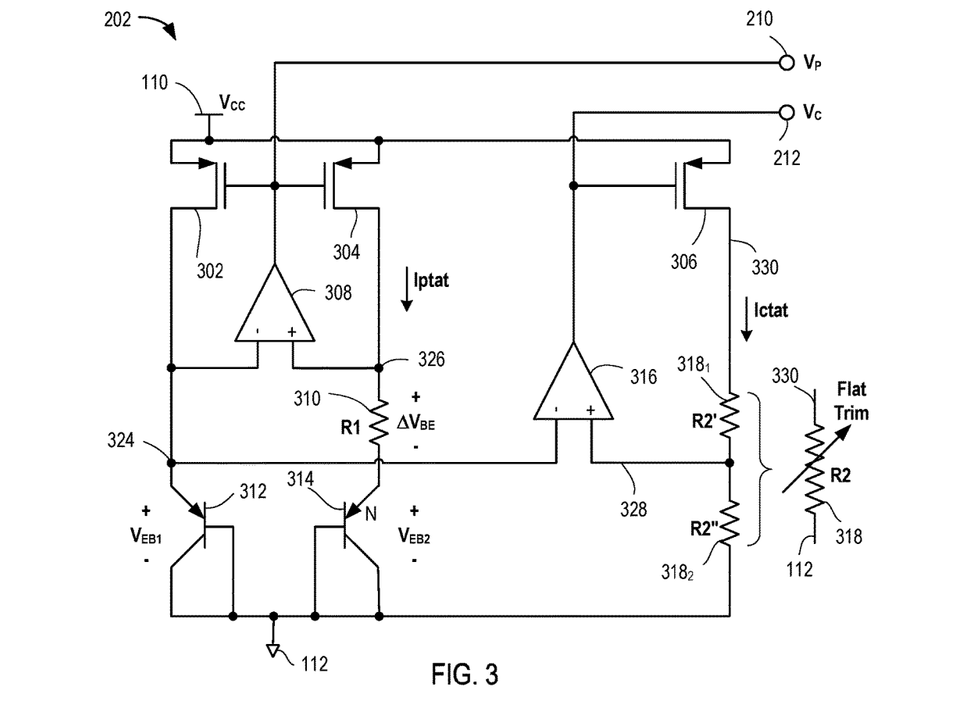
FIG. 3 is a schematic diagram depicting a reference circuit according to an example.

FIG. 3 is a schematic diagram depicting the reference circuit 202 according to an example. The reference circuit 202 includes p-channel field effect transistors (FETs) 302, 304, and 306, such as p-type metal oxide semiconductor FETs (MOSFETs). A p-channel FET is a FET that uses holes as the majority carrier to carry its channel current. The reference circuit 202 further includes an operational amplifier 308, an operational amplifier 316, a multiplexer 320, a resistor 310, a resistor ladder 318, a bipolar junction transistor (BJT) 312, and a BJT 314. The BJTs 312 and 314 are PNP transistors.

A source of the FET 302 is coupled to the node 110 that supplies $V_{CC}$. A drain of the FET 302 is coupled to a node 324. A gate of the FET 302 is coupled to the node 210 that supplies a control voltage $V_P$. A source of the FET 304 is coupled to the node 110. A drain of the FET 304 is coupled to a node 326. A gate of the FET 304 is coupled to the node 210. A source of the FET 306 is coupled to the node 110. A gate of the FET 306 is coupled to the node 212 that supplies a control voltage $V_C$. A drain of the FET 306 is coupled to a node 330. The resistor ladder 318, having a total resistance R2, is coupled between the node 330 and the ground node 112.

Figure 4:
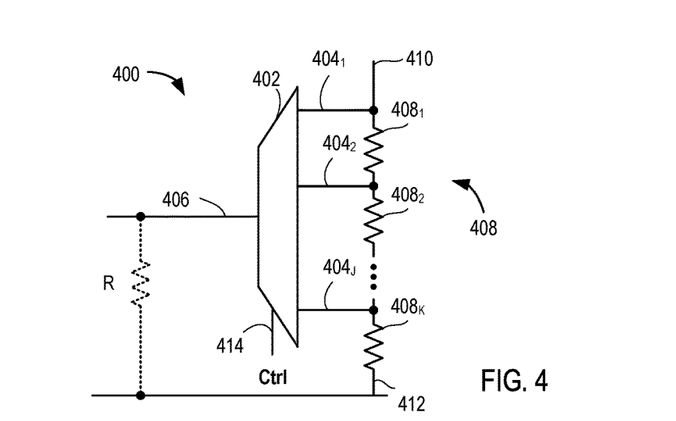
FIG. 4 is a schematic diagram depicting a resistor ladder according to example.

FIG. 4 is a schematic diagram depicting a resistor ladder 400 according to example. The resistor ladder 400 can be used as the resistor ladder 318 or any other resistor ladder described herein. The resistor ladder 400 includes a resistor string 408, e.g., resistors $408_1$ . . . $408_K$, where K is an integer greater than one. The resistors $408_1$ . . . $408_K$ are coupled in series between a node 410 and a node 412. The resistor ladder 400 further includes a multiplexer 402. Inputs of the multiplexer 402 are respectively coupled to a plurality of taps, e.g., taps $404_1$ . . . $404_J$, where J is an integer greater than one. Each tap $404_1$ . . . $404_J$ is coupled to a respective node of the resistor string 408, where the resistor string 408 includes one or more resistors between each pair of nodes. The multiplexer 402 includes a control input 414 for receiving a signal Ctrl that selects one of the taps 404. The signal Ctrl is a digital signal having ceiling[$\log_2(J)$] bits. The multiplexer 402 includes an output coupled to a node 406. The resistor ladder 400 provides an effective resistance R between the node 406 and the node 412 (shown in phantom for purposes of illustration), which depends on the code value of the Ctrl signal.

Returning to FIG. 3, a node 328 is coupled to a selected tap of the resistor ladder 318 based on the value of a Flat Trim code. This effectively splits the resistor ladder 318 into a resistance $318_1$ between the node 330 and the node 328, and a resistance $318_2$ between the node 328 and the ground node 112. The resistance $318_1$ has a value R2', and the resistance $318_2$ has a value R2".

An inverting input of the operational amplifier 308 is coupled to the node 324. A non-inverting input of the operational amplifier 308 is coupled to the node 326. An output of the operational amplifier 308 is coupled to the node 210. An inverting input of the operational amplifier 316 is coupled to the node 324. A non-inverting input of the operational amplifier 316 is coupled to a node 328. An output of the operational amplifier 316 is coupled to the node 212.

The resistor 310, having a resistance R1, is coupled between the node 326 and an emitter of the BJT 314. Each of a base and a collector of the BJT 314 is coupled to the ground node 112. Thus, the BJT 314 is a diode-connected BJT having an anode coupled to the resistor 310 and a cathode coupled to the ground node 112. An emitter of the BJT 312 is coupled to the node 324. Each of a base and a collector of the BJT 312 is coupled to the ground node 112. Thus, the BJT 312 is a diode-connected BJT having an anode coupled to the node 324 and a cathode coupled to the ground node 112. The BJT 314 has N times the emitter area as the BJT 312, where N is an integer greater than one.

In operation, the operational amplifier 308 is self-biasing and sets the control voltage $V_P$ to turn on the FETs 302 and 304. The operational amplifier 308 applies negative feedback so that the voltage at the node 324 equals the voltage at the node 326. The voltage at the node 324 is a voltage $V_{EB1}$, which is the voltage between the emitter and base of the BJT 312. The voltage $V_{EB1}$ is complementary to temperature (i.e., has a negative Tempco). The voltage at the emitter of the BJT 314 is $V_{EB2}$, which is the voltage between the emitter and base of the BJT 314. The voltage $V_{EB2}$ is complementary to temperature. The voltage across the resistor 310, between the node 326 and the emitter of the BJT 314, is $\Delta V_{BE} = V_{EB1} - V_{EB2} = V_{BE2} - V_{BE1}$. The differential voltage $\Delta V_{BE}$ can be mathematically expressed as $\Delta V_{BE} = n \ast V_T \ast \ln(N)$, where $V_T$ is the thermal temperature, n is the ideality factor, N is the ratio of emitter area between the BJT 314 and the BJT 312, and ln denotes the natural logarithm function. For purposes of example herein, the ideality factor n is assumed to be one and is omitted from subsequent expressions. The thermal voltage $V_T$=kT/q, where T is the temperature in Kelvin, k is the Boltzmann constant, and q is the electron charge in coulombs. As such, $\Delta V_{BE}$ is proportional to temperature (i.e., has a positive Tempco). $\Delta V_{BE}$ is also dependent on the ratio of collector current, which is related to the base current by the beta factor (i.e., beta=Ic/Ib, where Ic is the collector current and Ib is the base current). The current Iptat can be mathematically expressed as Iptat=$\Delta V_{BE}$/R1, which is also proportional to temperature. The voltage $V_P$ at the node 210 controls current sources in the Tempco circuits to mirror the current Iptat.

The operational amplifier 316 applies negative feedback through adjustment of the control voltage $V_C$ to equalize the voltage at node 328 and the voltage at node 324 (e.g., $V_{EB1}$). Thus, the current Ictat (going from the node 330 into the resistor ladder 318) can be mathematically expressed as Ictat=$V_{EB1}$/R2". Since $V_{EB1}$ is complementary to temperature, then Ictat is also complementary to temperature. The voltage $V_C$ at the node 212 controls current sources in the Tempco circuits to mirror the current Ictat. The current Ictat can be trimmed by varying the Flat Trim code. The flat trim balances the temperature coefficient by adjusting Ictat relative to Iptat so that Ictat+Iptat=Iztat is approximately constant over a range of temperature. Note that while the slope of Iptat with respect to temperature is constant, the slope of Ictat with respect to temperature is non-linear. Thus, Iztat varies from the desired constant value over a range of temperature. This first-order error is corrected, as described further below.

Figure 5:
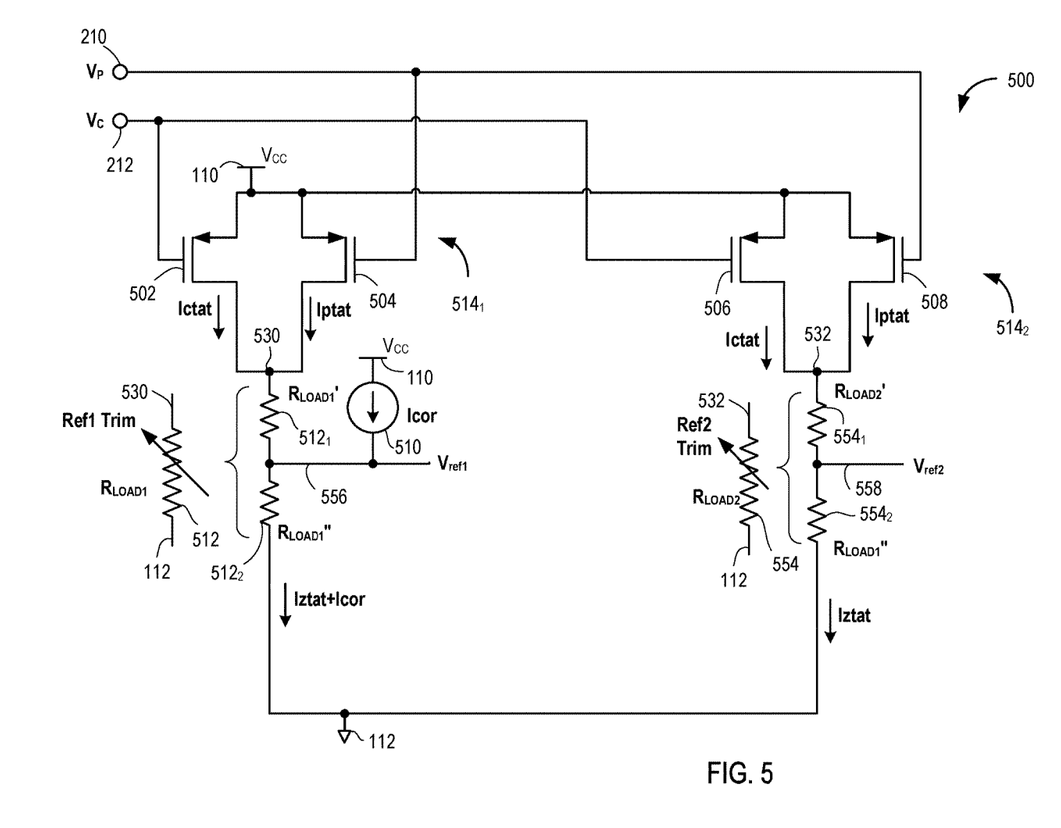
FIG. 5 is a schematic diagram depicting a temperature coefficient (Tempco) circuit according to an example.

FIG. 5 is a schematic diagram depicting a Tempco circuit 500 according to an example. The Tempco circuit 500 includes p-channel FETs 502, 504, 506, and 508 (e.g., p-type MOSFETs). The Tempco circuit 500 further includes a curvature correction circuit 510, a resistor ladder 512, and a resistor ladder 554.

A source of the FET 502 is coupled to the node 110 that supplies $V_{CC}$. A drain of the FET 502 is coupled to a node 530. A gate of the FET 502 is coupled to the node 212 that supplies the control voltage $V_C$. A source of the FET 504 is coupled to the node 110 that supplies $V_{CC}$. A drain of the FET 504 is coupled to a node 530. A gate of the FET 504 is coupled to the node 210 that supplies the control voltage $V_P$. A source of the FET 506 is coupled to the node 110. A drain of the FET 506 is coupled to a node 532. A gate of the FET 506 is coupled to the node 212 that supplies the control voltage $V_C$. A source of the FET 508 is coupled to the node 110 that supplies $V_{CC}$. A drain of the FET 508 is coupled to the node 532. A gate of the FET 508 is coupled to the node 210 that supplies the control voltage $V_P$. The FETs 502 and 504 form a current source 514$_1$ that mirrors Ictat and Iptat. The FETs 506 and 508 form a current source 514$_2$ that mirrors Ictat and Iptat.

The resistor ladder 512, having a resistance $R_{LOAD1}$, is coupled between the node 530 and the ground node 112. A node 556 is coupled to a selected tap of the resistor ladder 512 based on the value of the Ref1 Trim code. Selection of the tap results in a resistance 512$_1$ coupled between the node 530 and the node 556, and a resistance 512$_2$ coupled between the node 556 and the ground node 112. The resistance 512$_1$ has a value $R_{LOAD1}$', and the resistance 512$_2$ has a value $R_{LOAD1}$". The curvature correction circuit 510 is coupled to the node 556 to supply a current Icor, as described further below.

The resistor ladder 554, having a resistance $R_{LOAD2}$, is coupled between the node 532 and the ground node 112. A node 558 is coupled to a selected tap of the resistor ladder 554 based on the value of the Ref2 Trim code. Selection of the tap results in a resistance 554$_1$ coupled between the node 532 and the node 558, and a resistance 554$_2$ coupled between the node 558 and the ground node 112. The resistance 554$_1$ has a value $R_{LOAD2}$', and the resistance 554$_2$ has a value $R_{LOAD2}$".

In operation, the control voltage $V_C$ controls the FETs 502 and 506 to supply the current Ictat. The control voltage $V_P$ controls the FETs 504 and 508 to supply the current Iptat. The currents Ictat and Iptat feed the node 530. The control circuit 114 sets the Ref1 Trim to control values of $R_{LOAD1}$' and $R_{LOAD1}$". The curvature correction circuit 510 supplies a current Icor to the resistor ladder 512 such that, in steady state condition, the sum of the currents Iztat and Icor conducts through the resistance $R_{LOAD1}$".

The currents Ictat and Iptat feed the node 532. In steady state condition, the current Iztat conducts through the resistor ladder 554. The control circuit 114 controls sets Ref2 Trim to control values for $R_{LOAD2}$' and $R_{LOAD2}$". The voltage output by the LPF 538 is proportional to Iztat. The operational amplifier 540, the resistor 544, the resistor 546, and the resistor 552 are configured as a non-inverting amplifier that applies a configured amount of gain to the voltage output by the LPF 538. The gain is determined by the resistance values of the resistors 544, 546, and 552. The node 542 supplies a zero Tempco voltage $V_{ref2}$. The resistors 544, 548, and 552 form a voltage divider that supplies a fraction of $V_{ref2}$ at the node 550 (e.g., half of the voltage to generate $V_{ref2}$/2).

The Ref1 Trim and Ref2 Trim codes set a direct current (DC) level of the corresponding pre-gain voltages at the nodes 556 and 558, respectively. Gain circuits can be used to amplifier or attenuate the pre-gain voltages. Voltage dividers can then provide one or more fractions of the post-gain reference voltage.

In the example, the zero Tempco circuit 204 includes two current sources 514 for mirroring Ictat and Iptat to generate three zero Tempco voltages. In other examples, the zero Tempco circuit 204 can include less or more than two current sources 514 for generating any number of zero Tempco voltages. In an example, one or both of the gain circuits 516 can be omitted. Alternatively, another current source 514 can feed another resistor ladder that supplies a pre-gain output voltage.

Figure 6:
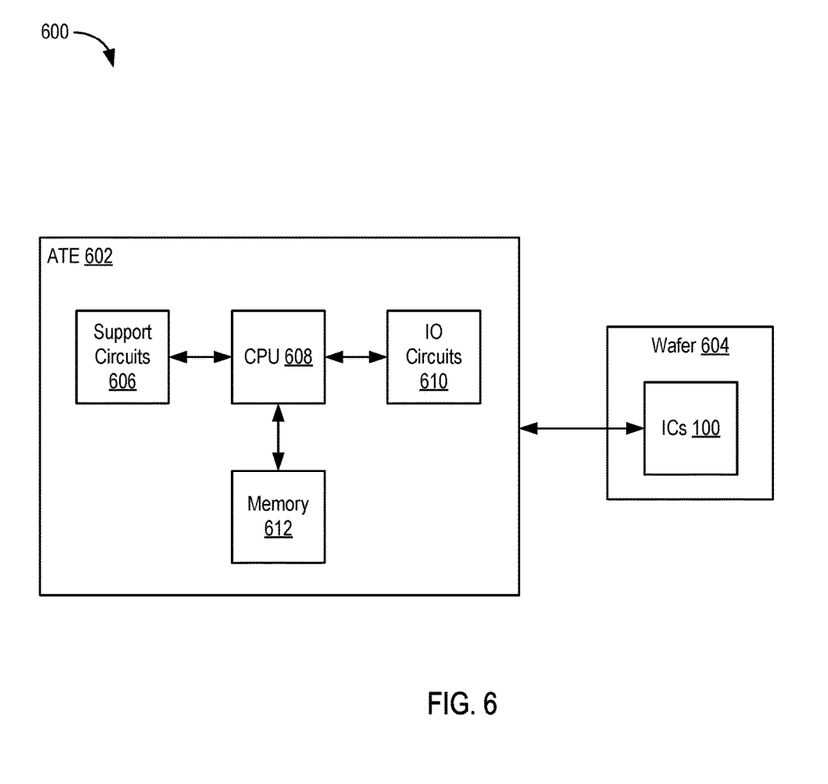
FIG. 6 is a block diagram depicting a test system according to an example.

FIG. 6 is a block diagram depicting a test system 600 according to an example. The test system 600 includes automatic test equipment (ATE) 602 and a wafer 604 having a plurality of ICs 100. The ATE 602 includes a central processing unit (CPU) 608, a memory 612, input/output (IO) circuits 610, and support circuits 606. The CPU 608 can be any type of general-purpose processor, such as an x86-based processor, ARM®-based processor, or the like. The CPU 608 can include one or more cores and associated circuitry (e.g., cache memories, memory management units (MMUs), interrupt controllers, etc.). The CPU 608 is configured to execute program code that perform one or more operations described herein and which can be stored in the memory 612. The support circuits 606 include various devices that cooperate with the CPU 608. For example, the support circuits 606 can include a chipset (e.g., a north bridge, south bridge, platform host controller, etc.), voltage regulators, firmware (e.g., a BIOS), and the like. In some examples, the CPU 608 can be a System-in-Package (SiP), System-on-Chip (SoC), or the like, which absorbs all or a substantial portion of the functionality of the chipset (e.g., north bridge, south bridge, etc.). The IO circuits 610 include various circuits configured for communication with the ICs 100.

The memory 612 is a device allowing information, such as executable instructions and data, to be stored and retrieved. The memory 612 can include, for example, one or more random access memory (RAM) modules, such as double-data rate (DDR) dynamic RAM (DRAM). The ATE 602 can include various other devices, including local storage devices (e.g., one or more hard disks, flash memory modules, solid state disks, and optical disks) and/or a storage interface that enables the test system 600 to communicate with one or more network data storage systems.

Figure 7:
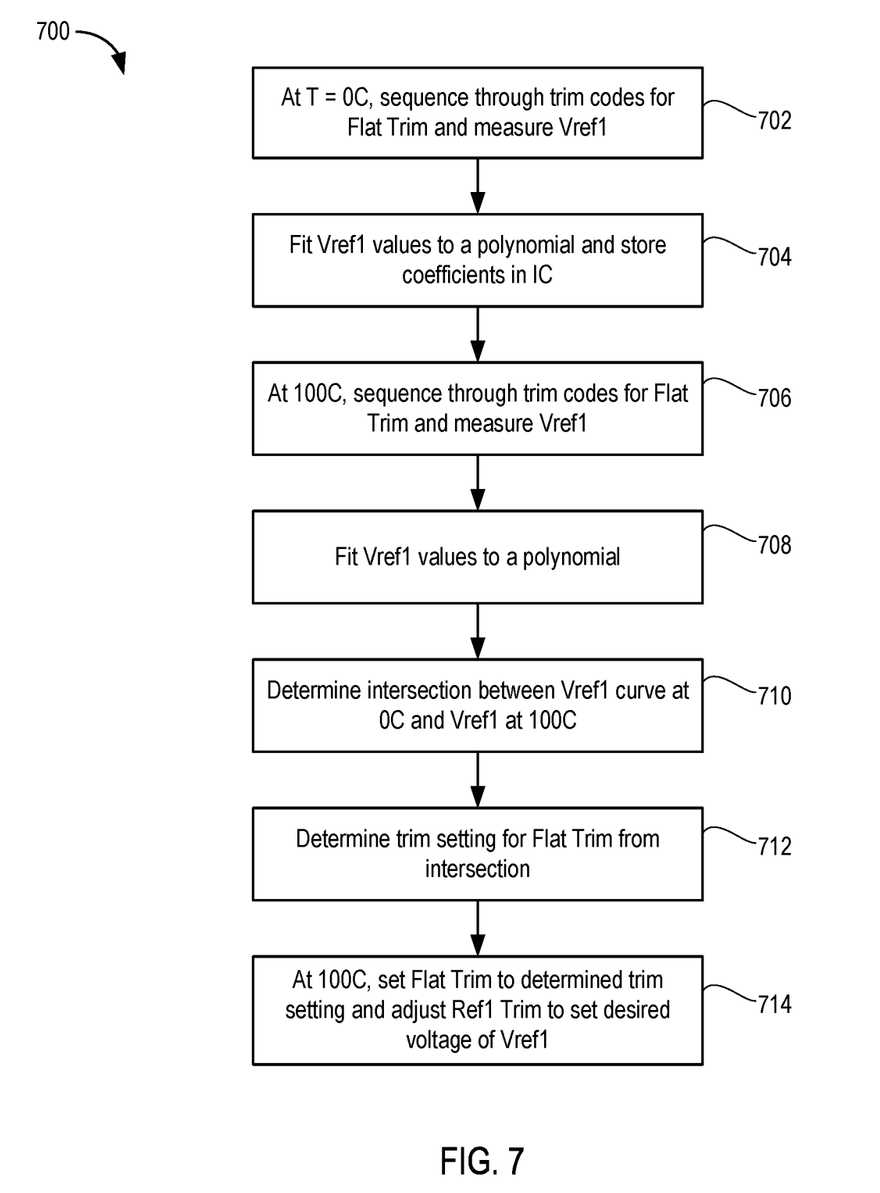
FIG. 7 is a flow diagram depicting a method of setting trim codes in a voltage reference circuit according to an example.

FIG. 7 is a flow diagram depicting a method 700 of setting trim codes in a voltage reference circuit according to an example. The method 700 can be performed by the ATE 602 for setting the Flat Trim in the reference circuit 202, and the Ref_x Trim (e.g., Ref1 Trim, Ref2 Trim, etc.) in the circuit 500, for each IC 100 on the wafer 604.

Figure 8A:
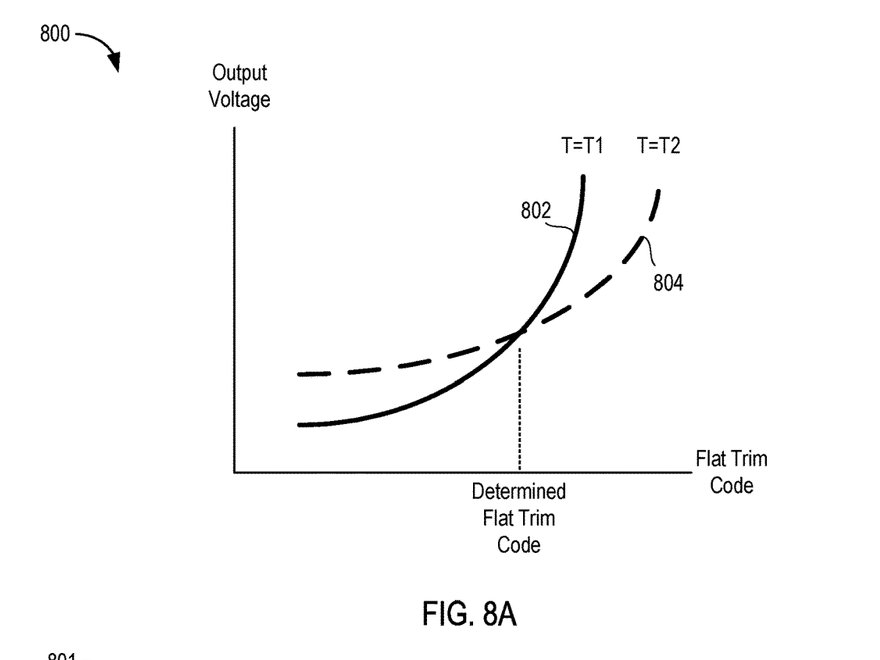
FIG. 8A is a graph 800 depicting flat trim codes versus output voltage at different temperatures according to an example.

The method 700 begins at step 702, where the wafer 604 is disposed in a 0 degree Celsius (0 C) environment and the ATE 602 sequences through trim codes for the Flat Trim and measures Vref1. The ATE 602 obtains a plurality of Vref1 values for a corresponding plurality of trim codes of the Flat Trim. At step 704, the ATE 602 fits the Vref1 values obtained at step 702 to a polynomial curve having one or more coefficients (e.g., three coefficients). The ATE 602 stores the values of the coefficients in the IC 100 (e.g., in the control circuit 114 using, for example, an electronic fuse (e-fuse) or the like type memory element). FIG. 8A is a graph 800 depicting flat trim codes versus output voltage at different temperatures according to an example. In the graph 800, the horizontal axis represents flat trim code and the vertical axis represents output voltage. A curve 802 represents the polynomial curve determined at 704 (where T1=0 C).

At step 706, the wafer 604 is disposed in a 100 degree Celsius (100 C) environment and the ATE 602 sequences through trim codes for the Flat Trim and measures Vref1. The ATE 602 obtains a plurality of Vref1 values for a corresponding plurality of trim codes of the Flat Trim. At step 708, the ATE 602 fits the Vref1 values obtained at step 706 to a polynomial curve having the same order as that used in step 704. In the graph 800, a curve 804 represents the polynomial curve determined at step 708.

Figure 8B:
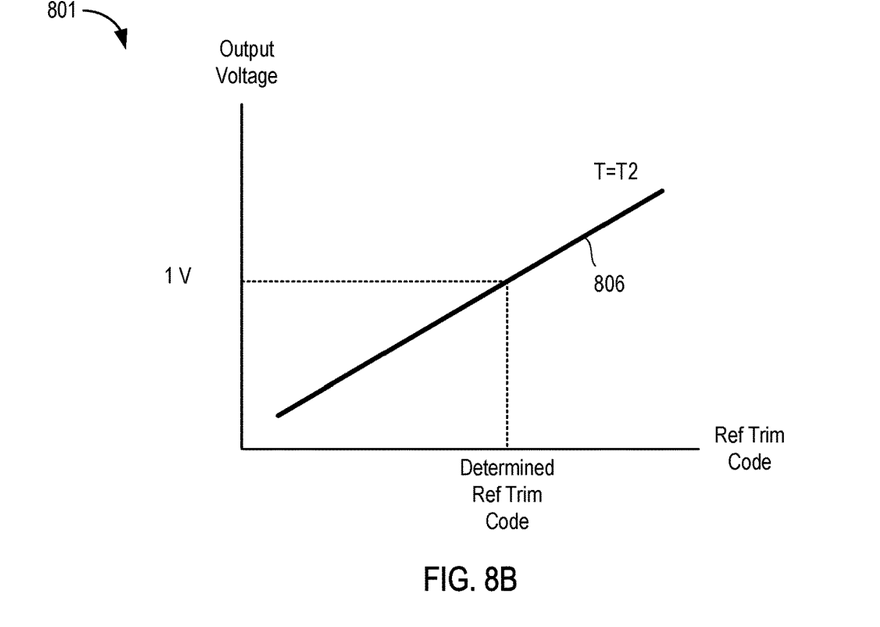
FIG. 8B is a graph 801 depicting ref trim codes versus output voltage at a particular temperature according to an example.

At step 710, the ATE 602 determines an intersection between the Vref1 curve at 0 C and the Vref1 curve at 100 C. The ATE 602 can generate the Vref1 curve at 0 C by obtaining the coefficients stored by the control circuit 114 in the IC 100. The ATE 602 generates the Vref1 curve at 100 C in step 708. At step 712, the ATE 602 determines a trim setting for the Flat Trim corresponding to the intersection between the Vref1 curve at 0 C and the Vref1 curve at 100 C. As shown in the graph 800, the intersection of the curve 802 and 804 results in the determined flat trim code value. At step 714, the ATE 602 sets the Flat Trim to the determined trim code at step 712 and adjusts the Ref1 Trim to set a desired voltage of Vref1 (e.g., 1V). FIG. 8B is a graph 801 depicting ref trim codes versus output voltage at a particular temperature (T=T2) according to an example. In the graph 801, the horizontal axis represents ref trim code and the vertical axis represents output voltage. A curve 806 represents ref trim code versus output voltage and an output voltage of 1V results in the determined ref trim code value.

Figure 9:
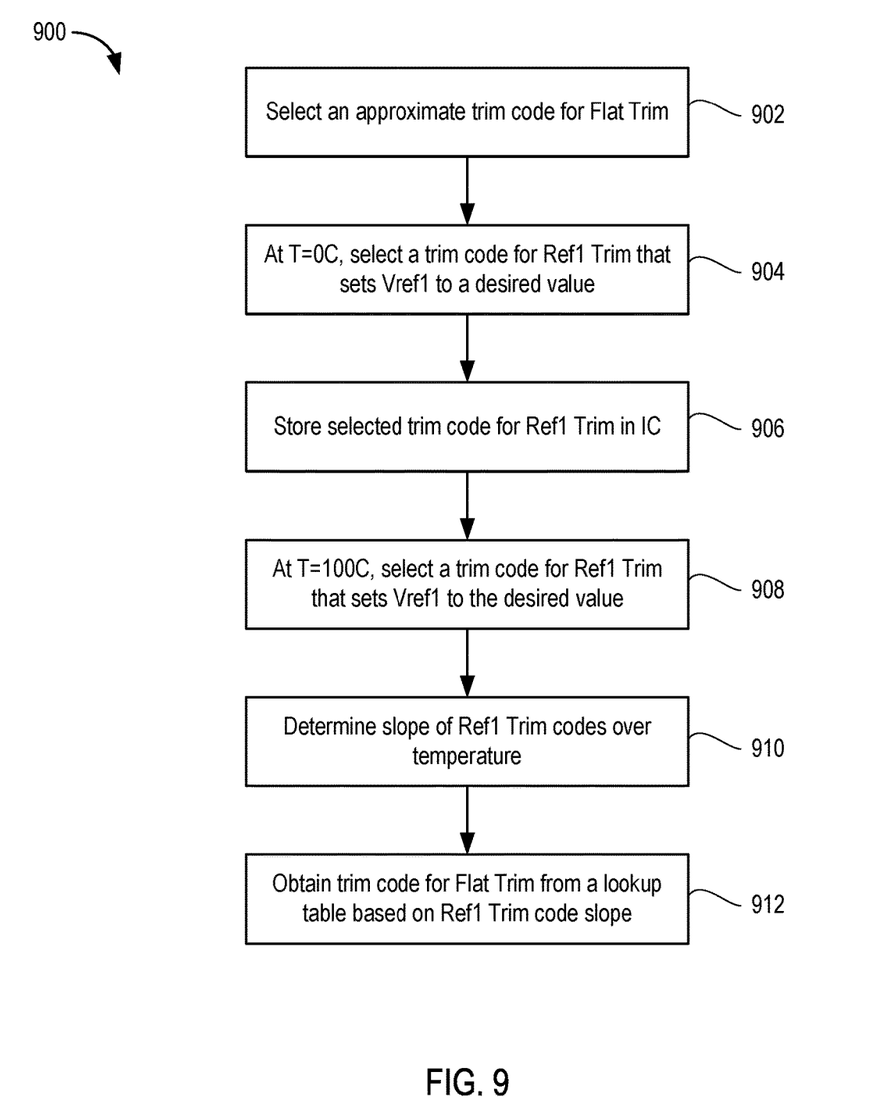
FIG. 9 is a flow diagram depicting a method of setting trim codes in a voltage reference circuit according to another example.

FIG. 9 is a flow diagram depicting a method 900 of setting trim codes in a voltage reference circuit according to an example. The method 900 can be performed by the ATE 602 for setting the Flat Trim in the reference circuit 202, and the Ref_x Trim (e.g., Ref1 Trim, Ref2 Trim, etc.) in the circuit 500, for each IC 100 on the wafer 604.

The method 900 begins at step 902, where the ATE 602 selects an approximate trim code for the Flat Trim. The approximate trim code for the Flat Trim can be set based on simulations of the voltage reference circuit. At step 904, the wafer 604 is disposed in a 0 C environment and the ATE 602 selects a trim code for the Ref1 Trim that sets Vref1 to a desired value (e.g., 1 V). The ATE 602 can adjust the Ref1 Trim and measure Vref1 until Vref1 obtains the desired value. At step 906, the ATE 602 stores the selected trim code for Ref1 Trim in the IC 100 (e.g., in the control circuit 114 using, for example, an electronic fuse (e-fuse) or the like type memory element).

Figure 10A:
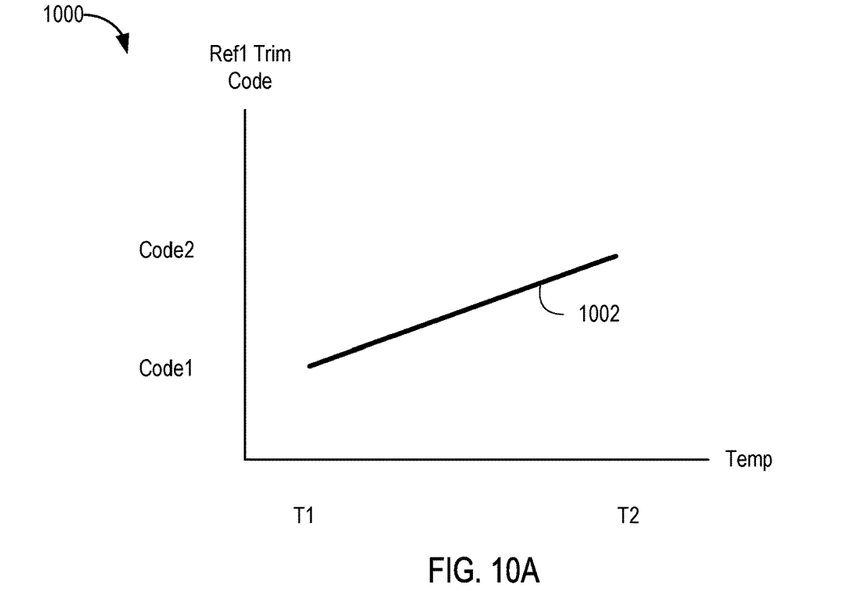
FIG. 10A is a graph depicting measurements of a reference trim code at two different temperatures according to an example.

At step 908, the wafer 604 is disposed in a 100 C environment and the ATE 602 selects a trim code for the Ref1 Trim that sets Vref1 to the desired value (e.g., 1 V). At step 910, the ATE 602 determines the slope of the Ref1 Trim code over temperature. For example, the ATE 602 can compute the difference between the Ref1 Trim code values at 0 C and at 100 C. FIG. 10A is a graph 1000 depicting measurements of the Ref1 Trim Code at two different temperatures according to an example. In the graph 1000, the horizontal axis represents temperature and the vertical axis represents Ref1 Trim Code value. At temperature T1, code1 is obtained. At temperature T2, code2 is obtained. If the temperature coefficient was zero, the same code would be obtained at both temperatures. The ATE 602 determines the slope of curve 1002 at step 910.

Figure 10B:
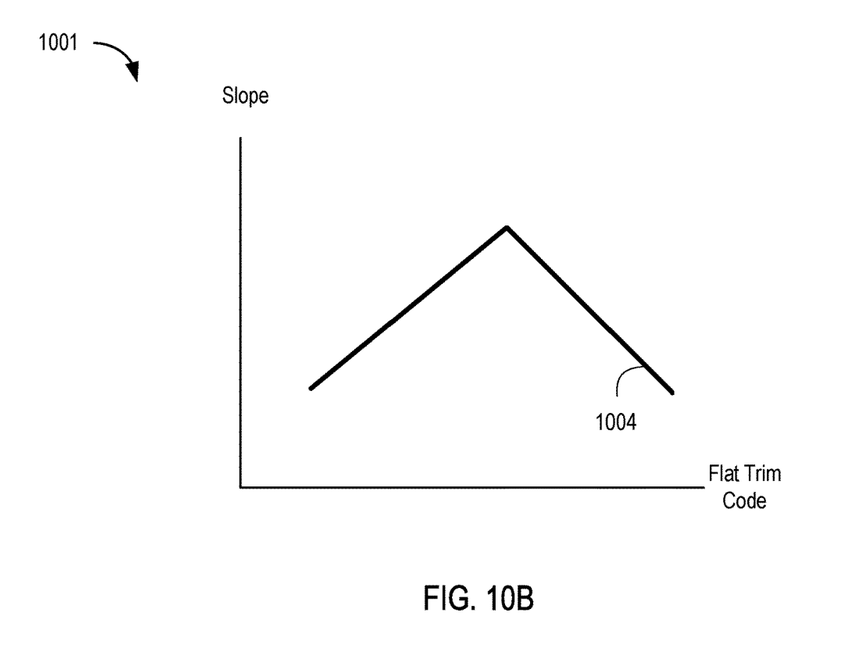
FIG. 10B is a graph depicting a lookup of the flat trim code according to an example.

At step 912, the ATE 602 obtains a trim code value for the Flat Trim from a lookup table based on the Ref1 Trim code slope determined at step 910. The lookup table can include a plurality of trim code values for the Flat Trim for a corresponding plurality of Ref1 Trim code slope values. FIG. 10B is a graph 1001 depicting a lookup of the flat trim code given a slope of Ref1 Trim according to an example. In the graph 1001, the horizontal axis represents flat trim code and the vertical axis represents the slope of the curve 1002 shown in FIG. 10A. The temperature coefficient determined in step 910 from the curve 1002 is corrected by changing the flat trim code setting based on a curve 1004.

Figure 11:
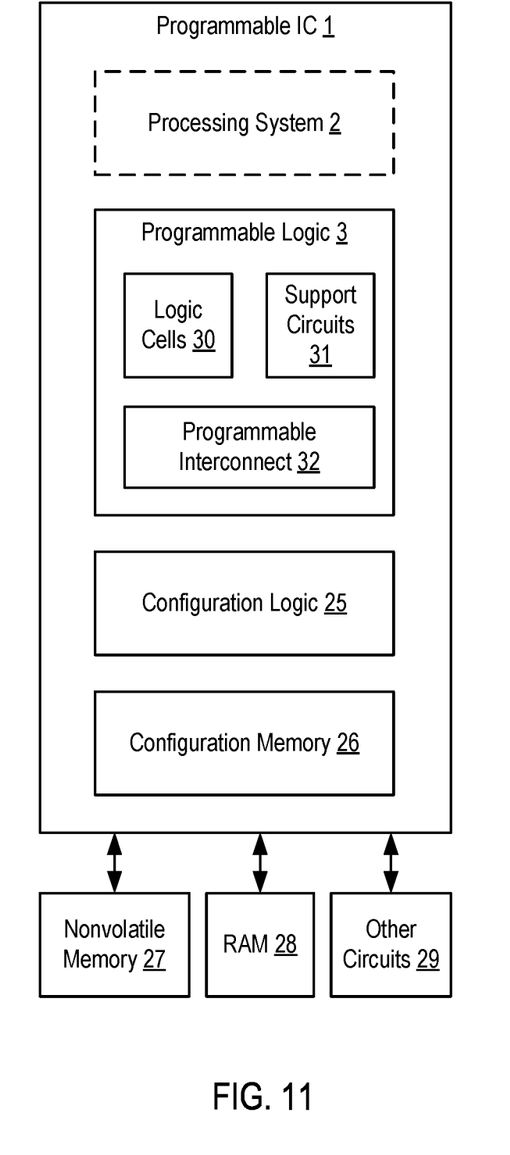
FIG. 11 is a block diagram depicting a programmable IC in which the voltage reference circuit described herein can be used according to an example.

FIG. 11 is a block diagram depicting a programmable IC 1 according to an example in which the voltage reference 200 described herein can be used. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

Figure 12:
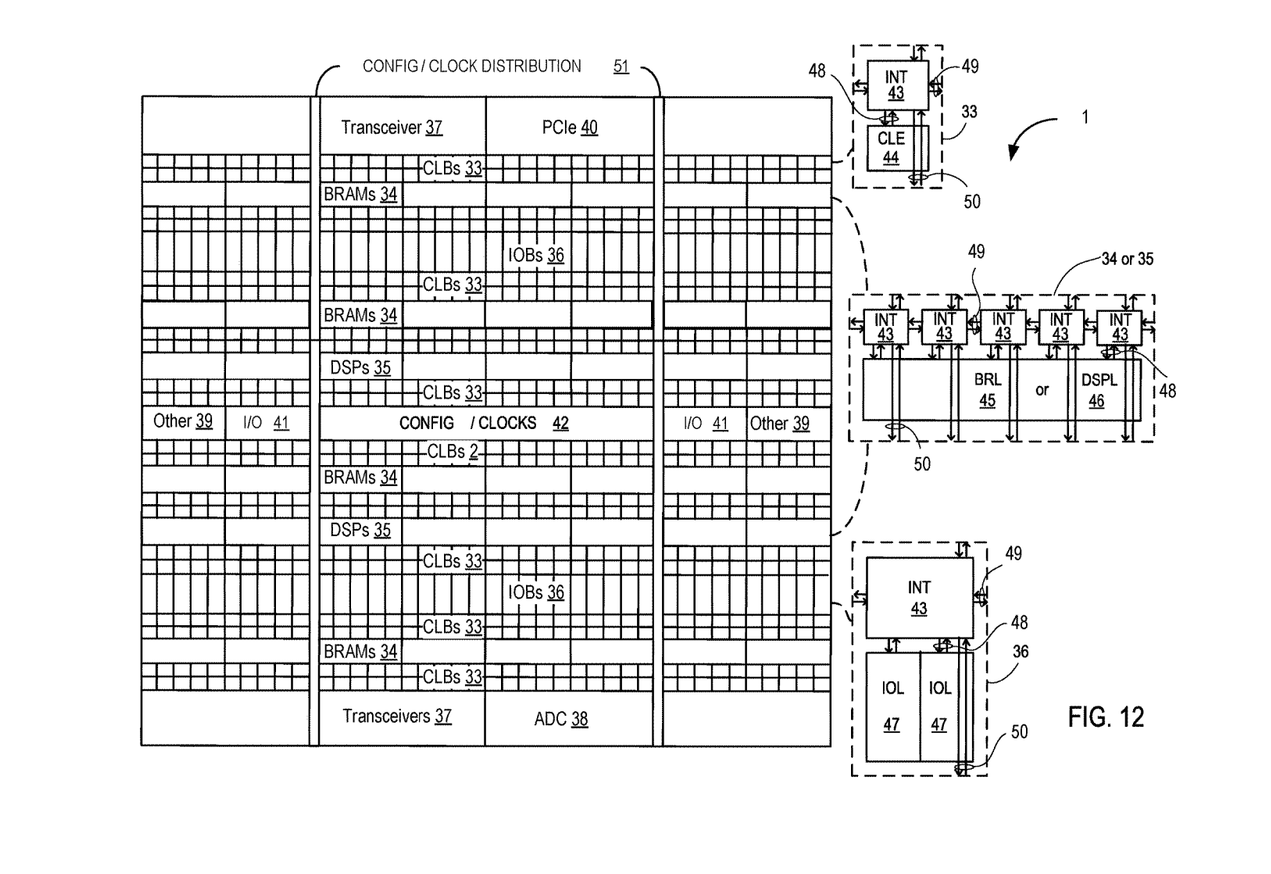
FIG. 12 illustrates a field programmable gate array (FPGA) implementation of the programmable IC of FIG. 9.

FIG. 12 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 12. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 12) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic.

Note that FIG. 12 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 12 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, a method of trimming a voltage reference in an integrated circuit (IC) includes: selecting an approximate trim code for a reference circuit of the voltage reference configured to generate a proportional-to-temperature current and a corresponding first control voltage, and a complementary-to-temperature current and a corresponding second control voltage; at a first temperature, selecting a first trim code for a temperature coefficient (Tempco) circuit, controlled by the reference circuit to generate the voltage output, to set the voltage output to a desired voltage; at a second temperature, selecting a second trim code for the Tempco circuit to set the voltage output to the desired voltage; and selecting a trim code for the reference circuit based on the first trim code and the second trim code.

In an example, the method described above further includes storing the first trim code in the IC. In an example, the method described above further includes: obtaining the first trim code from the IC; and determining a slope of the trim code of the Tempco circuit over temperature based on the first trim code and the second trim code. In an example, the method described above, wherein the step of selecting the trim code for the reference circuit comprises: obtaining the trim code from a lookup table based on the slope of the trim code of the Tempco circuit. In an example, the method described above wherein the approximate trim code is determined based on a simulation of the voltage reference.

In an example, an apparatus for trimming a voltage reference in an integrated circuit (IC) includes: a memory; and a processor configured to execute code stored in the memory to: select an approximate trim code for a reference circuit of the voltage reference configured to generate a proportional-to-temperature current and a corresponding first control voltage, and a complementary-to-temperature current and a corresponding second control voltage; at a first temperature, select a first trim code for a temperature coefficient (Tempco) circuit, controlled by the reference circuit to generate the voltage output, to set the voltage output to a desired voltage; at a second temperature, select a second trim code for the Tempco circuit to set the voltage output to the desired voltage; and select a trim code for the reference circuit based on the first trim code and the second trim code.

In an example, the apparatus described above wherein the processor is further configured to execute the code to: store the first trim code in the IC. In an example, the apparatus described above wherein the processor is further configured to execute the code to: obtain the first trim code from the IC; determine a slope of the trim code of the Tempco circuit over temperature based on the first trim code and the second trim code. In an example, the apparatus described above wherein the processor selects the trim code for the reference circuit by: obtaining the trim code from a lookup table based on the slope of the trim code of the Tempco circuit. In an example, the apparatus described above wherein the approximate trim code is determined based on a simulation of the voltage reference.

While the foregoing is directed to specific examples, other and further examples may be devised without departing from the basic scope thereof, and the scope thereof is determined by the claims that follow.

What is claimed is:

1. A method of trimming a voltage reference in an integrated circuit (IC), comprising:
   at a first temperature, sequencing through a first plurality of trim codes for a reference circuit of the voltage reference configured to generate a proportional-to-temperature current and a corresponding first control voltage, and a complementary-to-temperature current and a corresponding second control voltage;
   measuring a voltage output of the voltage reference for each of the first plurality of trim codes to obtain first voltage output values;
   at a second temperature, sequencing through a second plurality of trim codes for the reference circuit;
   measuring the voltage output of the voltage reference for each of the second plurality of trim codes to obtain second voltage output values; and
   selecting a trim code for the reference circuit based on the first voltage output values and the second voltage output values.

2. The method of claim 1, further comprising:
   fitting the first voltage output values to a polynomial; and
   storing one or more first coefficients of the polynomial in the IC.

3. The method of claim 2, further comprising:
   fitting the second voltage output values to the polynomial to generate one or more second coefficients; and
   determining an intersection between a first curve generated using the one or more first coefficients and a second curve generated using the one or more second coefficients.

4. The method of claim 3, wherein the step of selecting the trim code comprises determining the trim code from the intersection between the first curve and the second curve.

5. The method of claim 1, further comprising:
   adjusting trim of a temperature coefficient (Tempco) circuit, controlled by the reference circuit to generate the voltage output, to set the voltage output to a desired voltage.

6. The method of claim 1, wherein the reference circuit comprises:
   a first field effect transistor (FET) and a second FET having a first common source and a first common gate;
   a first diode-connected bipolar junction transistor (BJT) coupled between a drain of the first FET and a ground node;
   a first resistor and a second diode-connected BJT coupled in series between a drain of the second FET and the ground node;
   a first operational amplifier having a non-inverting input coupled to the drain of the second FET, an inverting input coupled to the drain of the first FET, and an output coupled to the first common gate;
   a third FET having a source coupled to the common source;
   a resistor ladder coupled between a drain of the third FET and the ground node; and
   a second operational amplifier having an inverting input coupled to the drain of the first FET, a non-inverting input coupled to the resistor ladder, and an output coupled to a gate of the third FET.

7. The method of claim 1, wherein the voltage reference includes:
   a first current source coupled to a first load circuit, the first current source generating a sum current of the proportional-to-temperature current and the complementary-to-temperature current in response to the first and second control voltages, the first load circuit generating a zero temperature coefficient (Tempco) voltage from the sum current; and
   a second current source coupled to a second load circuit, the second current source generating the sum current of the proportional-to-temperature current and the complementary-to-temperature current in response to the first and second control voltages, the second load circuit generating a negative Tempco voltage from the sum current and the complementary-to-temperature current.

8. The method of claim 7, wherein the first current source comprises a first field effect transistor (FET) and a second FET having a first common source and a first common drain, a gate of the first FET coupled to receive the first control voltage and a gate of the second FET coupled to receive the second control voltage, and wherein the first load circuit comprises a resistor ladder coupled between the first common drain and a ground node, the resistor ladder converting the sum current into the zero Tempco voltage.

9. The method of claim 7, wherein the second current source comprises:
   a first field effect transistor (FET) and a second FET having a first common source and a first common drain, a gate of the first FET coupled to receive the first control voltage and a gate of the second FET coupled to receive the second control voltage; and
   a third FET having a gate coupled to the second control voltage; and
   wherein the second load circuit comprises:
   a first resistor ladder and a second resistor ladder coupled in series between the first common drain and a ground node, the first and second resistor ladders receiving the sum current from the first common drain, a portion of the second resistor ladder receiving the complementary-to-temperature current from a drain of the third FET.

10. The method of claim 7, wherein the voltage reference includes:
    a third current source coupled to a third load circuit, the third current source generating the sum current of the proportional-to-temperature current and the complementary-to-temperature current in response to the first and second control voltages, the third load circuit generating a positive Tempco voltage from the sum current and at least one of the complementary-to-temperature current and the proportional-to-temperature current.

11. An apparatus for trimming a voltage reference in an integrated circuit (IC), comprising:
    a memory; and
    a processor configured to execute code stored in the memory to:
    at a first temperature, sequence through a first plurality of trim codes for a reference circuit of the voltage reference configured to generate a proportional-to-temperature current and a corresponding first control voltage, and a complementary-to-temperature current and a corresponding second control voltage;
    measure a voltage output of the voltage reference for each of the first plurality of trim codes to obtain first voltage output values;
    at a second temperature, sequence through a second plurality of trim codes for the reference circuit;

measure the voltage output of the voltage reference for each of the second plurality of trim codes to obtain second voltage output values; and select a trim code for the reference circuit based on the first voltage output values and the second voltage output values.

12. The apparatus of claim 11, wherein the processor is further configured to execute the code to:

fit the first voltage output values to a polynomial; and store one or more first coefficients of the polynomial in the IC.

13. The apparatus of claim 12, wherein the processor is further configured to execute the code to:

fit the second voltage output values to the polynomial to generate one or more second coefficients; and determine an intersection between a first curve generated using the one or more first coefficients and a second curve generated using the one or more second coefficients.

14. The apparatus of claim 13, wherein the processor selects the trim code by determining the trim code from the intersection between the first curve and the second curve.

15. The apparatus of claim 11, wherein the processor is further configured to execute the code to:

adjust trim of a temperature coefficient (Tempco) circuit, controlled by the reference circuit to generate the voltage output, to set the voltage output to a desired voltage.

16. The apparatus of claim 11, wherein the reference circuit comprises:

a first field effect transistor (FET) and a second FET having a first common source and a first common gate;

a first diode-connected bipolar junction transistor (BJT) coupled between a drain of the first FET and a ground node;

a first resistor and a second diode-connected BJT coupled in series between a drain of the second FET and the ground node;

a first operational amplifier having a non-inverting input coupled to the drain of the second FET, an inverting input coupled to the drain of the first FET, and an output coupled to the first common gate;

a third FET having a source coupled to the common source;

a resistor ladder coupled between a drain of the third FET and the ground node; and a second operational amplifier having an inverting input coupled to the drain of the first FET, a non-inverting input coupled to the resistor ladder, and an output coupled to a gate of the third FET.

17. The apparatus of claim 11, wherein the voltage reference includes:

a first current source coupled to a first load circuit, the first current source generating a sum current of the proportional-to-temperature current and the complementary-to-temperature current in response to the first and second control voltages, the first load circuit generating a zero temperature coefficient (Tempco) voltage from the sum current; and a second current source coupled to a second load circuit, the second current source generating the sum current of the proportional-to-temperature current and the complementary-to-temperature current in response to the first and second control voltages, the second load circuit generating a negative Tempco voltage from the sum current and the complementary-to-temperature current.

18. The apparatus of claim 17, wherein the first current source comprises a first field effect transistor (FET) and a second FET having a first common source and a first common drain, a gate of the first FET coupled to receive the first control voltage and a gate of the second FET coupled to receive the second control voltage, and wherein the first load circuit comprises a resistor ladder coupled between the first common drain and a ground node, the resistor ladder converting the sum current into the zero Tempco voltage.

19. The apparatus of claim 17, wherein the second current source comprises:

a first field effect transistor (FET) and a second FET having a first common source and a first common drain, a gate of the first FET coupled to receive the first control voltage and a gate of the second FET coupled to receive the second control voltage; and a third FET having a gate coupled to the second control voltage; and wherein the second load circuit comprises:

a first resistor ladder and a second resistor ladder coupled in series between the first common drain and a ground node, the first and second resistor ladders receiving the sum current from the first common drain, a portion of the second resistor ladder receiving the complementary-to-temperature current from a drain of the third FET.

20. The apparatus of claim 17, wherein the voltage reference includes:

a third current source coupled to a third load circuit, the third current source generating the sum current of the proportional-to-temperature current and the complementary-to-temperature current in response to the first and second control voltages, the third load circuit generating a positive Tempco voltage from the sum current and at least one of the complementary-to-temperature current and the proportional-to-temperature current.

* * * * *